United States Patent [19]

Plaat

[11] 4,171,036
[45] * Oct. 16, 1979

[54] BRAKE RETRACTOR MECHANISM

[75] Inventor: Cornelius L. Plaat, Troy, Ohio

[73] Assignee: The B. F. Goodrich Company, Akron, Ohio

[*] Notice: The portion of the term of this patent subsequent to Nov. 9, 1993, has been disclaimed.

[21] Appl. No.: 869,559

[22] Filed: Jan. 16, 1978

Related U.S. Application Data

[63] Continuation of Ser. No. 747,832, Dec. 6, 1976, abandoned, which is a continuation of Ser. No. 619,523, Oct. 3, 1975, abandoned.

[51] Int. Cl.² .......................................... F16D 65/54
[52] U.S. Cl. ............................ 188/196 R; 188/1 C; 188/71.8; 188/196 P; 192/70.25; 192/111 A
[58] Field of Search ............... 188/1 C, 71.8, 196 R, 188/196 P; 192/111 A, 70.25; 92/13; 74/492

[56] References Cited

U.S. PATENT DOCUMENTS

| | | | |
|---|---|---|---|
| 3,542,165 | 11/1970 | Lucien | 188/71.8 X |
| 3,566,996 | 3/1971 | Crossman | 188/196 P |
| 3,721,320 | 3/1973 | Hirsch | 188/1 C |
| 3,757,900 | 9/1973 | Gischlar | 188/1 C |
| 3,903,999 | 9/1975 | Ditlinger | 188/71.8 X |
| 3,958,670 | 5/1976 | Anderson | 188/71.8 X |
| 3,990,547 | 11/1976 | Plaat | 188/71.8 X |

Primary Examiner—George E. A. Halvosa
Attorney, Agent, or Firm—Harry F. Pepper, Jr.

[57] ABSTRACT

A brake retractor assembly in which the automatic adjustment apparatus includes a slitted drag tube and a ball carried by an adjusting pin engageable with the tube. The ball is slightly larger than the inside diameter of the tube so that as the brake wears the ball is pulled through the tube causing progressive expansion of the tube and thereby providing the necessary adjustment for wear. Increased resistance to movement of the ball is created on the ends of the drag tube by a "V" notch with a disappearing taper, a flange, or a high friction inner surface of the tube.

5 Claims, 5 Drawing Figures

BRAKE RETRACTOR MECHANISM

This application is a continuation of U.S application Ser. No. 747,832 filed Dec. 6, 1976, now abandoned, which application was, in turn, a continuation of U.S. application Ser. No. 619,523, filed, Oct. 3, 1975, also now abandoned.

BACKGROUND OF THE INVENTION

This invention relates to adjusting mechanisms for automatically maintaining a uniform release clearance (and therefore a uniform stroke) for brakes and similar equipment. Mechanisms of this type are commonly used in brake systems to compensate for wear of the brake linings and other brake parts and are popularly called "automatic brake adjusters". Although the present invention is explained here in connection with brakes, the mechanism has utility in other environments where similar wear compensation is needed such as in clutches.

The basis adjuster designs have included mechanical adjusters with special ratchets or friction dragging parts to provide the adjustment for wear. Hydraulic adjusters utilizing the metering of hydraulic fluid and adjusters with deformable tubes have also been used.

The adjusters in which an enlarged deforming member is pulled through a ductile deformable tube have the advantage or low cost and reliability. Problems with this type of adjuster have included providing the tube with a sufficient wall thickness to carry compressive or tensile loads while at the same time reducing the wall thickness to a minimum so that it can be used on brakes where the adjusting force is low. The interdependency of the predetermined yield strength of the tube and the required tensile or compressive yield strength has limited the use of this type of adjusters to applications where the adjusting force is high. There has also been a problem in providing different adjustment load levels with the same adjuster because this has necessitated changing dimensions of the tube such as the wall thickness and diameter or it has required a different tube material.

Further problems encountered with adjusters of the type aforementioned have included a nonuniform resistance to deformation of the tube over its entire length. Tubing stressed in the manner previously described tends to deform more easily at its longitudinal end portions as opposed to its more central portions.

SUMMARY OF THE INVENTION

The brake adjuster assembly of the present invention includes a tube which can be made to withstand the required compressive or tensile loads independent of the yield strength of the tube. The material of which the tube is made need not have special ductility for expansion and the same tube with minor changes can be used for adjusters where the adjusting force is low and where it is high. Progressive axial movement of a ball in the tube results in progressive expansion of the tube.

The tube has a flange, a "V" notch or a rough inner surface on its longitudinal end portions to increase resistance to the ball progressing axially through the tube, thereby giving the tube a uniform resistance over its entire length to movement of the ball.

DETAILED DESCRIPTION

Figure 1:
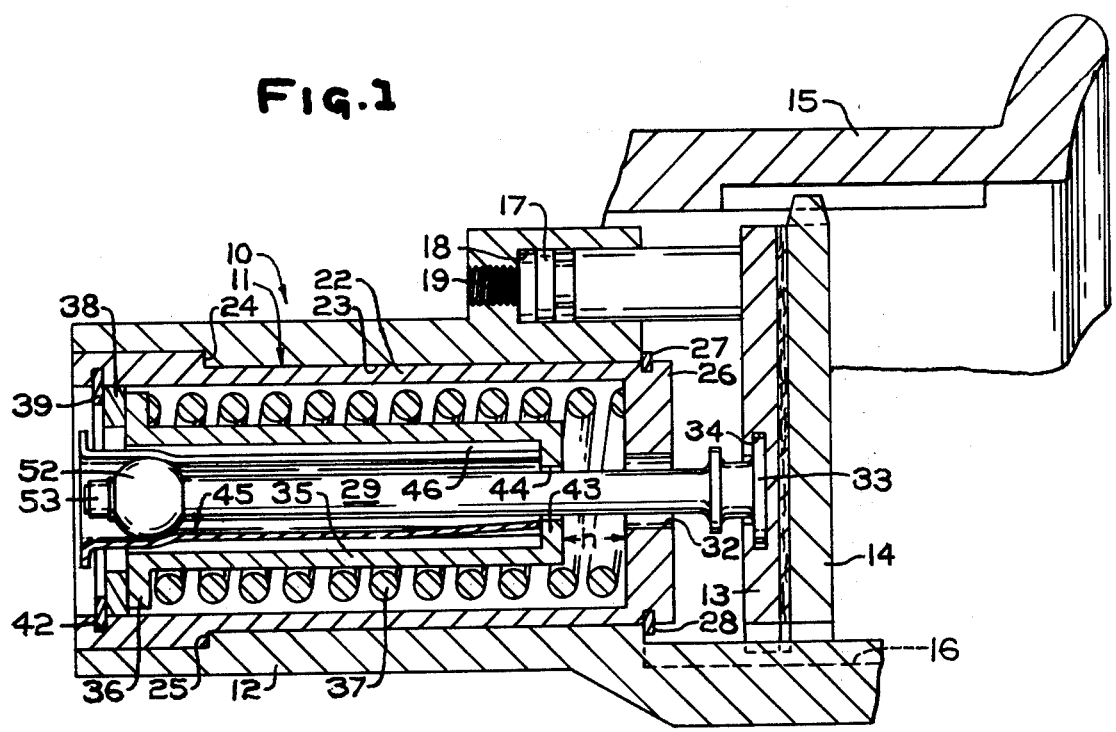
FIG. 1 is a longitudinal cross section of the adjuster assembly installed in a typical disc brake, the brake parts being shown in generalized or somewhat schematic form with some parts being broken away.

A brake retractor 10 including an adjuster assembly 11 is shown in FIG. 1 mounted rigidly in a torque frame 12 of a brake. In this embodiment the torque frame 12 carries a splined disc 13 in parallel axial alignment with a rotatable lining carrier 14. The latter is in splined engagement at its outer periphery with a rotating member which may be a wheel 15 of a vehicle or aircraft on which the brake is mounted. The splined disc 13 is also in splined engagement at its inner periphery with keyways 16 connected to the torque frame 12.

The brake is actuated and the splined disc 13 is engaged by a hydraulic piston 17 mounted in a cylinder 18 in the torque frame 12. A threaded port 19 in the frame 12 leading to the cylinder 18 may be connected to a source of hydraulic pressure for actuating the piston 17 to urge the splined disc 13 against the lining carrier 14 and bring other engageable parts of the brake (not shown) into frictional engagement to reduce the rotation or bring the wheel 15 to a complete stop. The brake retractor 10 as shown in FIG. 1 is in the retracted condition with the splined disc 13 and lining carrier 14 in the released condition where there is little if any frictional engagement and no pressure is exerted by the piston 17 against the splined disc 13.

The adjuster assembly 11 shown in FIG. 1 includes a cylindrical housing 22 which is adapted for mounting in a cylindrical opening 23 in the torque frame 12. The housing 22 may have a flange 24 at one end for engaging a shoulder 25 of the housing in the opening 23 of the frame 12. The housing 22 extends through the opening 23 at an end 26 adjacent the splined disc 13 and contains a circumferential groove 27 for receiving a split ring 28 to hold the housing in the opening.

A movable member such as retractor rod 29 extends through the housing 22 and a hole 32 in the end 26 of the housing where it is connected by insertion of a flanged head 33 in a slot 34 in the splined disc 13 or by other arrangements well known in the art.

A cylindrical sleeve 35 is interposed between the retractor rod 29 and the housing 22. The sleeve 35 has an outwardly extending flange 36 at the outer or left end of the adjuster assembly 11 as illustrated in FIG. 1. The flange 36 is located for engagement with the end of a helical coiled retractor spring 37 which is housed inside the housing 22 concentrically surrounding the sleeve 35 and engaging the spring retaining member or inner end 26 of the housing at the right of the adjuster assembly 11 (as viewed in FIG. 1).

A ring 38 having an outer diameter substantially equal to the inner diameter of the housing 22 and an inner diameter less than the diameter of the flange 36 is mounted in sliding engagement in the housing for engagement with the flange 36 and a retaining split washer 39 mounted in a circumferential slot 42 in the wall of the housing 22 for limiting retracting movement of the ring 38 and sleeve 35 in the outward direction or to the left as viewed in FIG. 1 and providing an anchorage to hold the spring 37 in compression.

The sleeve 35 has an inner end 43 at the right end of the adjuster assembly 11 as viewed in FIG. 1 with an opening 44 through which the retractor rod 29 extends. The inner end 43 of the sleeve 35 is spaced from the inner end 26 of the housing 22 a set-back distance indicated by the letter "h" in FIG. 1.

A tubular member which has a generally cylindrical shape such as drag tube 45 is interposed between the retractor rod 29 and the sleeve 35. The drag tube 45 is seated at an inner end 46 on the inner end 43 of the sleeve 35 and extends outwardly or to the left as viewed in FIG. 1 from the sleeve. A preferred embodiment of the drag tube 45 shown in FIGS. 1 and 2 has one longitudinally extending slit 69 passing entirely through the wall of the drag tube 45. The slit 70 is oriented parallel to the longitudinal axis 68 of the drag tube 45 and extends over the entire length of the drag tube. In FIG. 3 a similar slit 79 passes entirely through the wall of drag tube 75 and extends the entire length of the drag tube.

Figure 2:
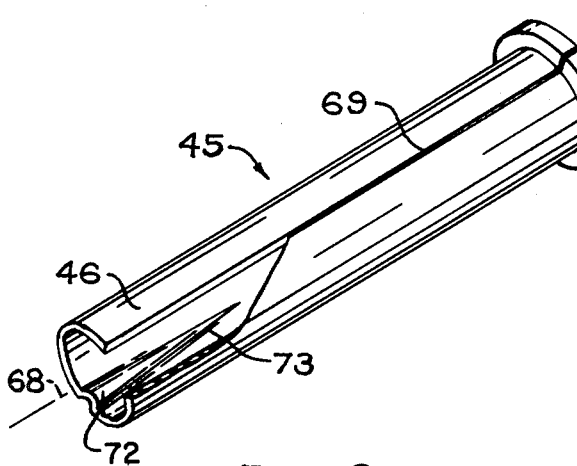
FIG. 2 is a view of the tubular member of the tubular member of FIG. 1 with a portion thereof broken away.
Figure 3:
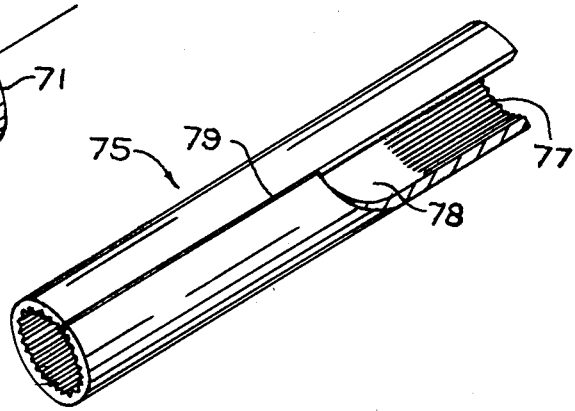
FIG. 3 is a modification of the tubular member with a portion thereof broken away.

Drag tubes of the type shown in FIGS. 2 and 3 can be manufactured by rolling a rectangular segment of flat metal into a substantially tubular shape, a process that is well known to one skilled in the art.

The retractor rod 29 has a tube expansion member such as a ball 52 mounted on the outer end by a nut 53 threaded on the end of the retractor rod. The ball 52 is generally spherical in shape and has a diameter slightly greater than the inner diameter of the drag tube 45 so that limited frictional resistance is applied to the drag tube as the ball 52 is pulled through the tube, expanding the tube as shown in FIG. 1.

In FIGS. 1 and 2, one end of the drag tube 45 is formed into a flange 71. The other end of the tube contains a "V" notch 72 with a disappearing taper 73. The flange and "V" notch can be obtained by stamping processes well known in the art. Referring to FIG. 3, the inner surface 78 of the drag tube 75 contains serrations 77 near each end of the tube 75. The roughing of this surface could also be accomplished by other means such as providing a pattern of dots, diamonds, etc. The serrations, dots, diamonds, etc. can be stamped onto the drag tube prior to rolling in a method which is also well known in the art.

When the brake is operated by communicating hydraulic fluid to piston 17 and the latter displaces the splined disc 13 towards the lining carrier 14, the retractor rod 29 is pulled axially through the hole 32 in the end 26 of the housing 22. The sleeve 35 is pulled in the same direction overcoming the force of the retractor spring 37 and moving the sleeve until the inner end 43 engages the stop or inner end 26 of the housing 22. If there is no appreciable wear or other conditions materially changing the release clearance between the selectively engageable parts including the splined disc 13 and lining carrier 14 while these members are engaged, then the retractor rod 29 will not be axially displaced and amounts sufficient to cause relative change in the position of the rod within the sleeve 35.

The adjuster assembly 11 is designed so that the set-back "h" indicated in FIG. 1 is equal to the maximum allowable release clearance between the engageable parts of the brake. So long as the release clearance does not exceed an amount indicated by the dimension "h", the relative position of the ball 52 within the drag tube 45 will remain the same.

As the brake wears, the release clearance between the retracted position of the splined disc 13 and the other engageable parts of the brake tends to increase progressively. The existence of this condition is automatically sensed in this mechanism because the retractor rod 29 and the splined disc 13 may be displaced for whatever distance necessary to bring about brake engagement regardless of wear. Accordingly, whenever the splined disc 13 and rod 29 are moved through a distance greater than that equal to the set-back distance "h" in order to engage the brake parts, the ball 52 will be forced through the drag tube 45 and expand the drag tube as shown in FIG. 1.

In the embodiment shown in FIGS. 1 and 2, as the ball 52 progressively expands the drag tube 45 the slit 69 will be progressively widened, thereby permitting further limited progression of the ball 52 along the longitudinal axis 68 of the tube.

Figure 4:
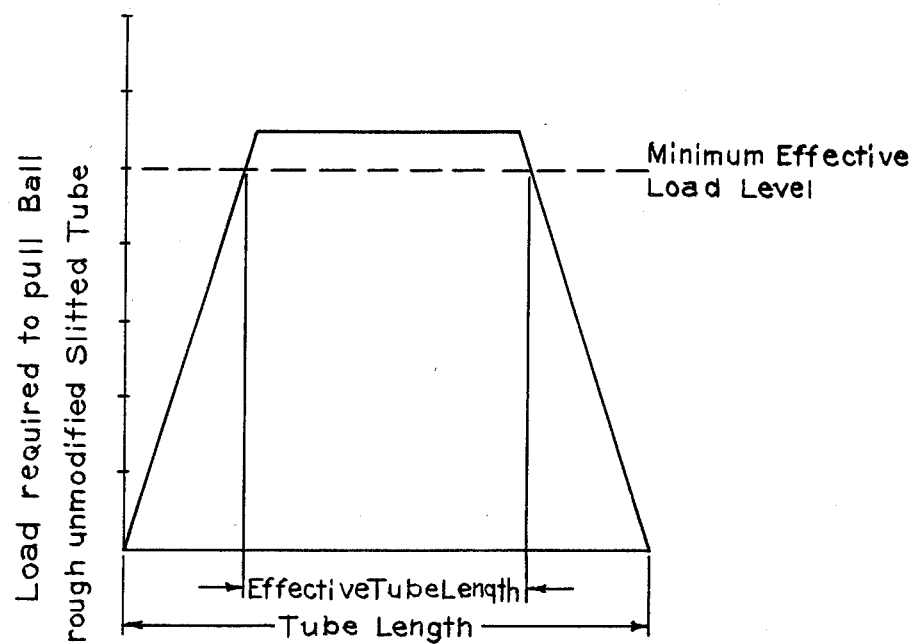
FIG. 4 is a graph of the load capabilities of a slitted drag tube.

FIG. 4 shows that the load required to pull an expansion member, such as a ball 52, through a slitted drag tube without modified end portions is below a minimum effective load level at these end portions. This load reaches a minimum effective load level for only about 55% of the length of the drag tube, and therefore only about 55% of the tube length is fully effective.

Figure 5:
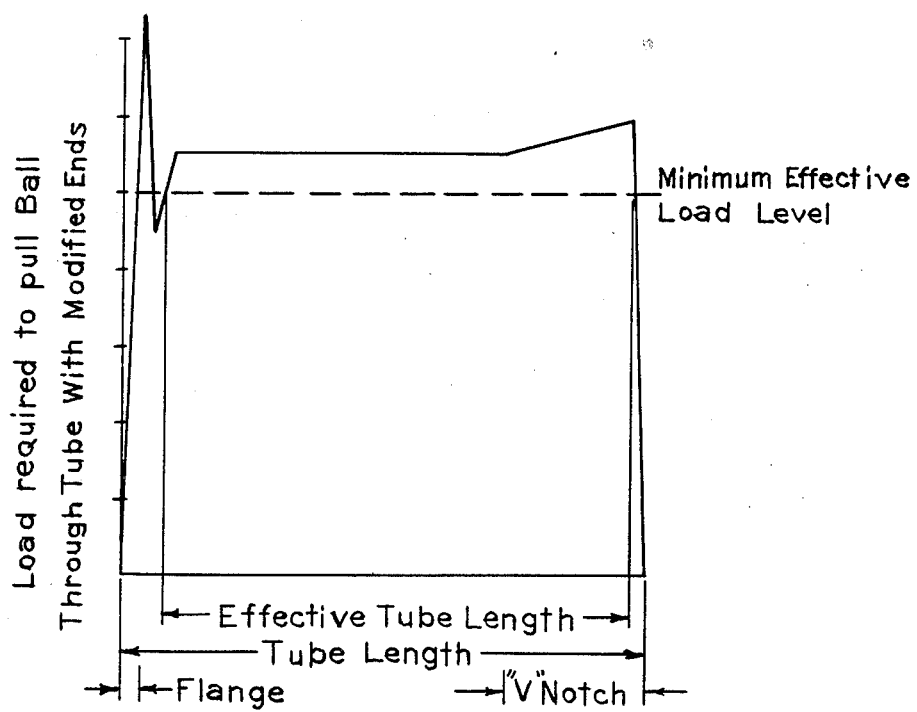
FIG. 5 is a graph of the load capabilities of a drag tube with modified ends.

Modified drag tubes such as 45 and 75 with means for increased resistance at each longitudinal end portion have increased effective lengths. FIG. 5 shows the load characteristics of a drag tube with a flanged end and a V-notched end. It can be seen that the effective length of this modified drag tube is about 80% of its actual length.

The means for increasing resistance to movement of an expansion member in drag tube 45 are a flange 71 at one end portion and a "V" notch 72 with a disappearing taper 73 heretofore described at the other end portion. The flange 71 resists expansion by stiffening the drag tube. The "V" notch 72 gradually reduces the effective inside diameter of the drag tube 45, thereby forcing the ball 52 to further expand the drag tube 45. Effects of the flange and "V" notch can be seen in FIG. 5.

Referring to FIG. 3, the serrations 77 at each end of the drag tube 75 similarly increase resistance to the movement of an expansion member, such as a ball 52 by increasing the coefficient of friction between the expansion member and the tube 75.

The extent of the progressive expansion of the tube 45 is a function of the wear in the engageable parts of the brake of which the friction lining wear is the major part.

Referring again to FIG. 1, after the release of fluid pressure against the piston 17 the force of the retractor spring 37 against a flange 36 will return the sleeve 35 to the fully retracted position. Accordingly, the retractor rod 29 will return the splined disc 13 to the retracted position. Then since the actuation forces have been removed the brake will revert to its free position. The retraction stroke is limited by the set-back distance "h" through which the sleeve 35 can move and therefore the rod 29 is retracted only a distance equivalent to the set-back "h". A new starting position is then established for the rod 29 and the splined disc 13 in which the release clearance between the engageable brake parts is again equal to the set-back distance "h".

The progressive expansion of the drag tube 45 and relocation of the starting position of the rod 29 and the splined disc 13 in a manner heretofore described does not change the maximum deflection amplitude of the retractor spring 37. The retractor spring 37 deflection amplitude remains sustantially the same upon retraction from the time the brake is new until the friction linings are entirely worn out.

When the brake is released the engagement of the ball 52 with the drag tube 45 is adequate to maintain the rod in any adjusted position. After the friction linings are worn to a point where replacement of the lining carrier 14 and other lining carriers is necessary, the drag tube 45 may be replaced simply by unscrewing nut 53 from the end of the retractor rod 29 and removing the ball 52. The drag tube 45 may then be pulled out of the sleeve 35 and replaced with a new tube.

In the adjuster assembly embodiment of FIG. 1, the ball 52 operates to impose compressive forces upon drag tube 45. It should be noted that the drag tubes 45 or 75 are also well suited to accept forces in tension. This can be accomplished by restraining the drag tube from its left end, as viewed in FIG. 1, by one of the methods known in the art.

Although the foregoing structure has been described for the purpose of illustrating a presently preferred embodiment of the invention, it should be understood that many modifications or alterations may be made without departing from the spirit and the scope of the invention as set forth in the appended claims.

I claim:

1. An adjuster assembly for regulating the release clearance between two selectively engageable friction parts to compensate for wear in such parts comprising an expansion member adapted for axial movement in response to actuation and release of said selectively engageable parts, a tubular member of substantially constant diameter throughout its length in frictional and expandable engagement with said expansion member mounted on said assembly for limited axial movement with said expansion member, said tubular member having only a single slit in the wall thereof extending longitudinally the entire length of said tubular member and passing entirely through said wall throughout such length and means for arresting the movement of said tubular member such that said expansion member is adapted for axial and non-cutting movement relative to said tubular member causing the walls of said tubular member to expand whereby the relative axial movement of said expansion member is equal to the wear of such friction parts.

2. The adjuster assembly according to claim 1 wherein said tubular member further comprises means to increase frictional engagement with said expansion member at an end portion of said tubular member.

3. The adjuster assembly according to claim 2 wherein said means to increase frictional engagement comprises serrations along the inner surface of said tubular member at said end portion.

4. The adjuster assembly according to claim 2 wherein said means to increase frictional engagement comprises a flange at said end portion.

5. The adjuster assembly according to claim 2 wherein said means to increase frictional resistance comprises a disappearing tapered "V" notch at said end portion.

* * * * *